(12) United States Patent
Delaney

(10) Patent No.: US 6,976,263 B2
(45) Date of Patent: Dec. 13, 2005

(54) MECHANISM FOR ENCODING AND DECODING UPGRADEABLE RPC/XDR STRUCTURES

(75) Inventor: William P. Delaney, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 404 days.

(21) Appl. No.: 10/001,875

(22) Filed: Nov. 19, 2001

(65) Prior Publication Data

US 2003/0097490 A1    May 22, 2003

(51) Int. Cl.[7] .............................................. G06F 9/46
(52) U.S. Cl. ..................................... 719/330; 709/200
(58) Field of Search ........................ 719/330; 709/200

(56) References Cited

U.S. PATENT DOCUMENTS

| | | | |
|---|---|---|---|
| 5,218,699 A | * | 6/1993 | Brandle et al. ............. 719/328 |
| 5,774,719 A | * | 6/1998 | Bowen ......................... 719/330 |
| 5,926,636 A | * | 7/1999 | Lam et al. ................... 719/313 |
| 6,446,137 B1 | * | 9/2002 | Vasudevan et al. ......... 719/330 |
| 6,493,768 B1 | * | 12/2002 | Boutcher ..................... 719/330 |
| 6,556,220 B1 | * | 4/2003 | Hammond ................... 345/764 |

* cited by examiner

Primary Examiner—St. John Courtenay, III
Assistant Examiner—Phuong N. Hoang
(74) Attorney, Agent, or Firm—Suiter West PC LLO

(57) ABSTRACT

A method and system for communicating across heterogeneous networks having components with dissimilar data structure definitions is disclosed in which determinations are made as to whether the sender is up-level or down-level and whether the up-level data structure size is greater or lesser than the down-level data structure size. According to these determinations, data fields for the decoded data structure may skip data or assign default values. The invention reduces upgrade costs and system down time.

7 Claims, 1 Drawing Sheet

| | Sender up-level Receiver down-level | Sender down-level Receiver up-level |
|---|---|---|
| Up-level has more elements | Receiver ignores extra data elements | Receiver uses "default" values |
| Down-level has more elements | Restricted/disallowed | Restricted/disallowed |

| | Sender up-level Receiver down-level | Sender down-level Receiver up-level |
|---|---|---|
| Up-level has more elements | Receiver ignores extra data elements | Receiver uses "default" values |
| Down-level has more elements | Restricted/disallowed | Restricted/disallowed |

MECHANISM FOR ENCODING AND DECODING UPGRADEABLE RPC/XDR STRUCTURES

FIELD OF THE INVENTION

The present invention generally relates to the field of computer network communications, and particularly to a method of communication involving encoding and decoding data between devices having dissimilar structure definitions.

BACKGROUND OF THE INVENTION

In a distributed system, the data is processed by a set of components connected by a network. The components may have different hardware and/or operating systems and may send and receive data using different transfer syntaxes. Data often needs to be in a form which permits the data to be distributed across the network by converting the data into the format required for the destination component's hardware or operating system.

The Remote Procedure Call (RPC) package defines an industry-standard procedure calling model for distributed applications by invoking an independent set of functions used for accessing remote nodes on a network. The RPC model is derived from the programming model of local procedure calls. An RPC executes a procedure located in a separate address space from the calling code. It uses a procedure declaration for every procedure call. All calls to a procedure must conform to the procedure declaration. The RPC protocols extend the concept of local procedure calls across the network, which means distributed applications may be developed for transparent execution across a network.

The External Data Representation (XDR) defines a standard representation for data in the network to support heterogeneous network computing. The XDR standard data representation convention is a set of library routines that allows a programmer to describe arbitrary data structures in a machine-independent fashion. By using XDR, systems do not have to understand and translate every data format that may exist on the network as there is only the one convention. Data is translated into XDR format before it is sent over the network and, when received, is translated into the data convention used there. New computer architectures can be incorporated into the network without requiring the updating of translation routines.

The current technique for specifying the information exchanged between RPC clients and servers is based on the use of an interface definition file that uses syntax similar to C code. This file contains a specification of each data element that can be exchanged. The type of each such element can be either a primitive (built-in) type, such as integer, character, Boolean, etc., or a complex (derived) type, such as a structure or union. For RPC applications with even modest complexity, the vast majority of exchanged data elements are of a complex type, with most common being structure and union.

To facilitate the development of client and server application software, the RPC/XDR model uses a tool that automatically generates code to translate between the network representation of a data element and the language-specific implementation of that element. Since structure data types are the most relevant for this environment, techniques used for generating translation code for them are the point of focus. A structure is really just an ordered collection of fields, where each field has its own characteristic data type. Consequently, in the RPC/XDR model, the code to translate a structure consists of a sequence of statements, each of which translates one field within the structure. If a field is of a primitive (built-in) data type, there are built-in library routines within the RPC/XDR package that handle the translation, so the code generator creates code that calls into the library. If a field is of a complex type, the code generator creates code that translates it by invoking the auto-generated code for that field's complex type.

The key restriction with the current methodology is that the side that is encoding the data and the side that is decoding it must be using auto-generated code that was derived from exactly the same version of the interface definition. The reason for this is that the encoder simply dumps the encoded version of each successive field into the message stream, and the decoder extracts the exact same number of fields from the message stream at the other side of the connection. If the decoder were to be based on an interface definition for the structure that contained more fields than the encoder knew about, the decoder would try to extract data for the additional fields from the message stream, even though the encoder did not place any such data in the message. On the other hand, if the decoder's structure definition contained fewer fields than the encoder's, the decoder would finish decoding and leave extra data in the message stream. This would interfere with further decoding of structures and other data elements that follow the structure in question, since the decoders for those ensuing elements would try to decode data that is really not part of their elements.

The standard resolution for this problem in the RPC/XDR environment is to simply create new structures, in addition to the old ones, and modify all the relevant elements of the interface definition to ensure that both the old and the new/enhanced structures are used where appropriate. This generally requires the development of an entire new interface definition, and the need for new code to support both the new and the old versions of the interface. Over time, this evolves into a need to support multiple (i.e., even more than two) versions of the interface, which is a serious maintenance issue.

The only real alternative is to use a lock-step migration strategy. When changes are needed to the interface definition, they are made on both the client and the server. All clients and all servers must then be upgraded to the new interface definition in a lock-step deployment. This approach reduces the amount of code required, and thus the maintenance effort, but imposes extreme difficulties in the deployment phase, since incompatible versions of the interface must not coexist.

Therefore, it would be desirable to provide a method and system for communicating between network elements having dissimilar data structure definitions.

SUMMARY OF THE INVENTION

Accordingly, the present invention is directed to a method and system for data communications between network elements in a heterogeneous network which is platform independent.

This invention is an extension of current techniques for automatically generating language-specific translation code for information that flows between heterogeneous systems via network interactions. In particular, this invention focuses on a new technique that can be applied to the Remote Procedure Call (RPC) and External Data Representation (XDR) frameworks standardized by Sun Microsystems. With the current approach, the client and server side of an RPC connection must operate with exactly the same structure definitions for all data objects that are passed from one side to the other. This requirement stems from the fact that the automatically-generated code that translates between the network and local data representations has no provisions for managing situations where one side is using an up-level or down-level version of the object definitions relative to the other side. This invention provides for extensions to the existing methodology by which the translation code is generated so that the client and server can correctly operate even when they are using different versions of the data objects identified in the RPC interface definition. It is described specifically as a solution to the problem of versioned structures in the RPC/XDR environment, but the essence of the invention is applicable in any environment where information needs to be encoded/decoded for exchange between heterogeneous entities.

This invention relates to a system and method for communicating across a heterogeneous network having components with dissimilar data structure definitions, comprising: 1) prefixing all encoded data structures with a length value that reflects the size of the encoded data structure; 2) for an up-level sender, if the up-level definition of data elements is greater than the down-level definition of data elements, the down-level receiver reads the length value and decodes the encoded data structure according to the receiver's data definition and upon completion of decoding, the receiver determining the amount of the encoded data structure that was decoded and skipping the remainder of the encoded data structure according to the length value; 3) for a down-level sender, if the up-level definition of data elements is greater than the down-level definition of data elements, for built-in type data fields, automatically assigning a default value to any field for which the received data has provided no value, and, for derived type data fields, calling an initialization routine which assigns a default value to any built-in type data field or calls the initialization routine for a derived type data field; and 4) to avoid the complexities associated with assignment of default values and initialization routines following a set of predetermined rules which include extending only data structures which are passed from a server to a client; ensuring that a down-level client's ignorance of extended data causes no ill effects in that client's operational behavior; allowing down-level clients to interact with up-level servers and disallowing up-level clients from interacting with down-level servers; and, in cases where extensions are needed for data structures passed from a client to a server, defining a new data structure that includes both old data fields and new data fields.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figures 1, 2:
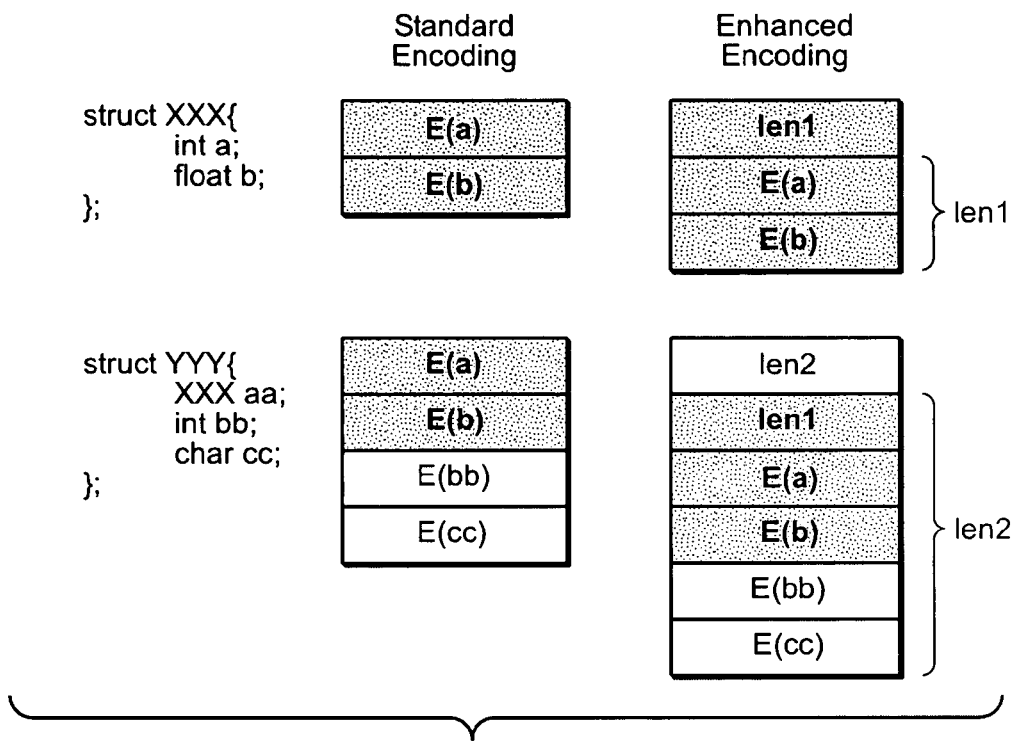
FIG. 1 illustrates both the traditional XDR encoding scheme and the enhanced encoding scheme for two different exemplary structures.
FIG. 2 illustrates a table of the different modes of operation.

Reference will now be made in detail to the presently preferred embodiments of the invention, examples of which are illustrated in the accompanying drawings.

Referring generally now to FIGS. 1 and 2, an exemplary embodiment of the present invention is shown.

It is common to interconnect a variety of computer architectures and computer operating systems in a single network. In a heterogeneous distributed computing environment there will be differences in the way that data is represented on different machine architectures. To handle these differences External Data Representation (XDR) library routines may be used to encode all components of a message before a transmission, and to decode the components of a message after reception.

One configuration commonly used for performing operations over a network is a client/server architecture. A heterogeneous network may include various clients and servers such as a Windows client, a Windows NT server, and a Unix server and may include software applications, operating systems, hardware products, peripheral devices, and system hardware. Servers provide services and include database servers, transaction servers, groupware servers, file servers and object servers. A client process that is executing either on a server computer or another computer is a consumer of services provided by the server. Each interaction between a client and a server tells a server which service is requested. After the server receives the request, the server determines how to perform the service specified in the request.

Communications between a client and a server over heterogeneous network require a method for transporting requests over network from a client running under one operating system to a server that is either running under another operating system, or the same operating system. After the server component management function module determines received data in a format compatible with a server computer, the server component management function module reads the version specified in the received data. One widely used method for communication over heterogeneous network is a remote procedure call (RPC).

The use of RPCs introduces limitations on updates and modifications. The standard resolution for this problem in the RPC/XDR environment is to simply create new structures, in addition to the old ones, and modify all the relevant elements of the interface definition to ensure that both the old and the new/enhanced structures are used where appropriate. This generally requires the development of an entire new interface definition, and the need for new code to support both the new and the old versions of the interface. Over time, this evolves into a need to support multiple (i.e., even more than two) versions of the interface, which is a serious maintenance issue. Alternatively, when changes are needed to the interface definition, they are made on both the client and the server. All clients and all servers must then be upgraded to the new interface definition in a lock-step deployment to support each version, regenerated, recompiled, and relinked for each of the computers on the network. For heterogeneous networks, this is a formidable task. Thus, while the trend is to implement RPC for component management over a heterogeneous network, the requirement of the current RPC architecture for either consistent versions or support of all versions throughout such a network will limit the actual utilization of RPC for component management.

With the enhanced technique of this invention, it is possible to upgrade the data structure definitions within a given RPC/XDR specification, such that clients and servers at different versions may coexist. Furthermore, the new technique does not require the server to implement a multitude of versions of the interface definition.

In the enhanced methodology, the sender of a given data element always encodes it using the version of the data definition that is "current" for the sender. This statement applies without regard to whether the sender is the client or the server. The receiver, on the other hand, must be able to accommodate receipt of data elements that were encoded using either newer (i.e., up-level) or older (i.e., down-level) versions of the interface definition. Equivalently, the receiver must handle data elements in the in-bound message that are either larger or smaller than expected, given the receiver's operating definition of the data elements. The techniques for handling these two cases are presented below.

A situation in which messages with more-than-expected data elements can be received if the sender is up-level relative to the receiver, and the up-level definition of the structure contains more data elements than the down-level definition being used by the receiver. It can also occur if the sender is down-level and the up-level definition being used by the receiver contains fewer data elements. The latter case is more difficult to handle, so a reasonable restriction is imposed that up-level definitions must always extend the data structures with additional elements.

To handle the former case, the RPC/XDR data conventions are modified as follows. First, when encoding a structure, the sender will prefix the encoded version of the data with a length value that reflects the encoded size of the structure, as shown in FIG. 1. (All encoded data has a length value.) Second, when decoding a structure, the receiver will read the length prefix, then decode the data according to the receiver's data definition. Upon completion of this process, the receiver determines the amount of encoded data that was consumed. If this amount is less than the known encoded length of the structure, the extra amount is simply skipped. This has the effect of positioning the receiver's decoding algorithm at the appropriate offset in the message to begin decoding the next data element. For example, in the structure XXX in FIG. 1, the sender uses an up-level definition that includes some new field named c (following the existing fields a and b). In this case, the encoded length value (lenl) will include the encoded length of field c. However, the decoder only knows how to decode fields a and b. Upon completing this known work, the decoder will detect that some amount of un-decoded data remains for structure XXX, and will simply skip over it. This applies even when the decoder is operating on an embedded version of structure XXX as a field of structure YYY.

A situation in which messages with fewer-than-expected data elements can be received is if the sender is down-level relative to the receiver, and the down-level definition of the structure contains fewer data elements than the up-level definition being used by the receiver, see FIG. 2. It can also occur if the sender is up-level, and the down-level definition being used by the receiver contains more data elements. As indicated above, the latter case imposes extra difficulties, and is thus restricted. To handle the former case, the RPC/XDR data conventions are modified as follows. First, as stated above, the sender must prefix the encoded version of the data with a length value that reflects the encoded size of the structure. Second, when decoding a structure, the receiver will first read the length prefix. In this situation, there may be some fields of the receiver's structures that have no encoded value in the data from the sender. Consequently, the decoding algorithm used on the receiver side will always check, before beginning to extract data for each field of the structure, to see if the encoded length has already been reached. If it has not, decoding proceeds in the usual way. However, if all of the encoded data has been consumed, the decoding routine will set the receiver's additional fields to a "default" value. The specification of default values is handled via extensions to the interface definition language used for RPC/XDR.

The only real extensions required of the RPC/XDR interface definition language are for support of default value specifications for structure fields that are not present in a received message. A given field can be either a built-in type or a complex (derived) type.

For built-in types, an appropriate "default specification" in the RPC/XDR language is simply a grammar extension of the form "=default-value", where default-value is an appropriate value for that type (i.e., integer, floating point, Boolean, string, etc.). This extension allows automatic generation of code for decoding data that will assign the appropriate value to any field of a built-in type that is not present in the inbound message.

For fields of a derived type, the problem is a bit more difficult. However, it can be solved using the same basic approach as above, where only built-in types have a default value specification. The code generator of XDR translation routines creates an appropriate initialization routine for each defined derived type. This initialization routine contains code that sets each field within the derived type to its default value by either directly initializing the value for a field of built-in type, or by calling the initialization routine for a field of a derived type.

From the preceding discussion, it is clear that substantially more effort is required to handle the case where received data contains fewer-than-expected data elements. This case requires changes to the encoding and decoding logic, and non-trivial extensions to the interface definition language. On the other hand, the case where more-than-expected data elements are received can be handled with less overall effort, since none of the interface definition changes are required. It is possible to exploit just this subset of the enhancement, provided the following rules are followed:

1) Upgrade (i.e., extend) only those structures that are passed from the server to the client. Ensure that a down-level client's ignorance of the extended data causes no ill effects in that client's operational behavior. This is done through the careful extension of the structures. It depends heavily on the specific details of the interface being modified.

2) Allow down-level clients to interact with up-level servers, but disallow up-level clients from interacting with down-level servers.

3) In cases where a new version (i.e., up-level) of the interface requires modifications/extensions are needed for structures passed from client to server, it will be necessary to define a new structure that includes both the old fields and the new fields. That is, the upgradeable structure support must not be used in these cases, since it would violate the rules that allow just the subset of this enhancement to be used (this corresponds to the case of FIG. 2 for an up-level sender in which the up-level structure has more data elements).

For this subset, the interface definition language extensions can be omitted, resulting in a simpler implementation.

It is believed that the A MECHANISM FOR ENCODING AND DECODING RPC/XDR UPGRADEABLE RPC/XDR STRUCTURES of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for communicating across a heterogeneous network including a sender and a receiver with dissimilar data structure definitions, comprising:

when the sender is an up-level sender and the receiver is a down-level receiver, if the up-level definition of a structure has more data elements than the down-level definition of the structure, then prefixing an encoded data structure with a length value that reflects a size of the encoded data structure and decoding the encoded data structure in which the down-level receiver reads the length value and decodes the encoded data structure according to the receiver's data definition and upon completion of decoding, the receiver determining an amount of the encoded data structure that was decoded and skipping a remainder of the encoded data structure according to the length value;

when the sender is a down-level sender and the receiver is an up-level receiver, if the up-level definition of a structure has data elements than the down-level definition of the structure, for built-in type data fields, automatically assigning a default value to any field for which the received data has provided no value, and, for derived type data fields, calling an initialization routine which assigns a default value to any built-in type data field or calls the initialization routine for a derived type data field; and when the sender is an up-level server and the receiver is a down-level client, if the up-level definition of a structure requires more data elements than the down-level definition of data elements, then following a set of predetermined rules which include extending only data structures which are passed from the up-level server to the down-level client; ensuring that the down-level client's ignorance of extended data causes no ill effects in that client's operational behavior; allowing down-level clients to interact with up-level servers and disallowing up-level clients from interacting with down-level servers; and, in cases where extensions are needed for data structures passed from a client to a server, defining a new data structure that includes both old data fields and new data fields.

2. The method of claim 1, wherein the method is practiced without creating new data structures.

3. The method of claim 1, wherein the method does not use a lock-step migration strategy.

4. The method of claim 1, wherein the built-in type includes at least one of the group consisting of integer, floating point, Boolean, and string.

5. The method of claim 1, wherein the derived type includes at least one of structure and union.

6. The method of claim 1, wherein the method is implemented using a procedure calling model for distributed applications and a standard representation for data in the network to support heterogeneous network.

7. The method of claim 6, wherein the procedure calling model is defined by the Remote Procedure Call (RPC) package and the standard representation of data is accomplished through the External Data Representation (XDR).

* * * * *